United States Patent [19]

Ishizu

[11] Patent Number: 5,179,578
[45] Date of Patent: Jan. 12, 1993

[54] COHERENT DEMODULATOR FOR π/4 SHIFTED QPSK SIGNAL

[75] Inventor: Fumio Ishizu, Kanagawa, Japan

[73] Assignee: Mitsubishi Denki Kabushiki Kaisha, Tokyo, Japan

[21] Appl. No.: 643,308

[22] Filed: Jan. 22, 1991

[30] Foreign Application Priority Data

Jan. 26, 1990 [JP] Japan .................. 2-16414

[51] Int. Cl.⁵ .................. H03D 3/22; H04L 27/22
[52] U.S. Cl. .................. 375/86; 375/54; 375/81; 375/83; 329/304; 329/306
[58] Field of Search .................. 375/54, 81, 83–86; 329/304, 306, 308

[56] References Cited

U.S. PATENT DOCUMENTS

| | | | |
|---|---|---|---|
| 4,054,838 | 10/1977 | Tretter | 375/81 |
| 4,085,378 | 4/1978 | Ryan et al. | 375/86 |
| 4,255,713 | 3/1981 | Yoshida | 375/81 |
| 4,344,178 | 8/1982 | Waters | 375/86 |
| 4,520,493 | 5/1985 | Heard et al. | 375/81 |

FOREIGN PATENT DOCUMENTS 0270160  6/1988  European Pat. Off. .
2063629  6/1981  United Kingdom .

Primary Examiner—Curtis Kuntz
Assistant Examiner—Young Tse
Attorney, Agent, or Firm—Rothwell, Figg, Ernst & Kurz

[57] ABSTRACT

A demodulator for coherent demodulation of a π/4 shifted QPSK signal includes a −π/4 phase-shift circuit in a conventional QPSK signal decision/feedback type Costas loop to alternately rotate the phase of an inputted π/4 shifted QPSK signal by 0 and −π/4 for each symbol period interval from a timing controller, thus eliminating the π/4 shift component of the π/4 shifted QPSK signal. Thus, coherent detection demodulation for the π/4 shifted QPSK signal having stable points at intervals of π/2 phase angles is enabled.

10 Claims, 11 Drawing Sheets

○ : K = odd
△ : K = even

FIG. 6
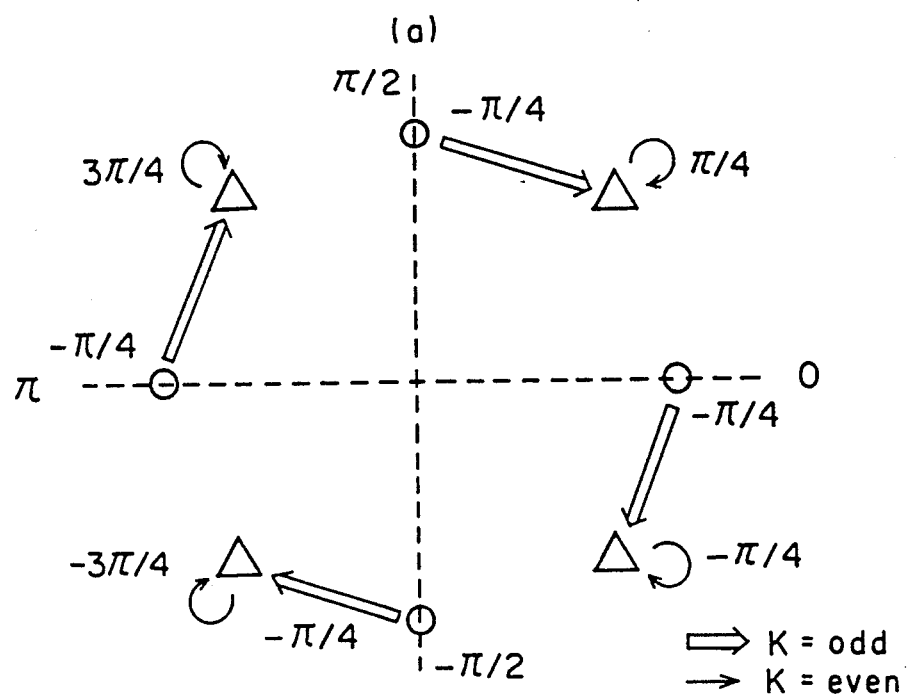
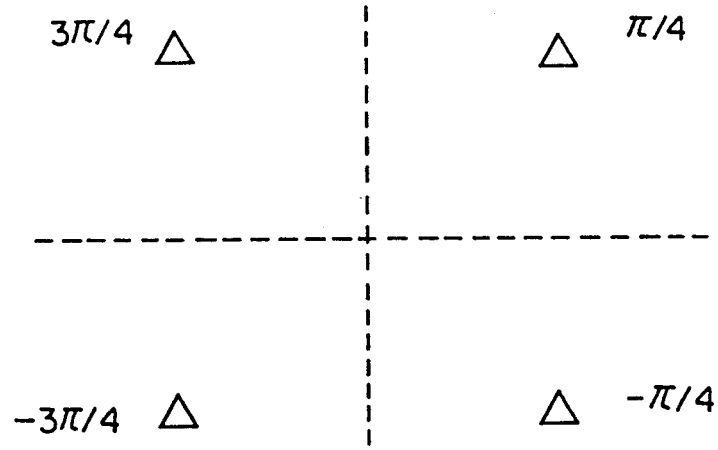

FIG. 7
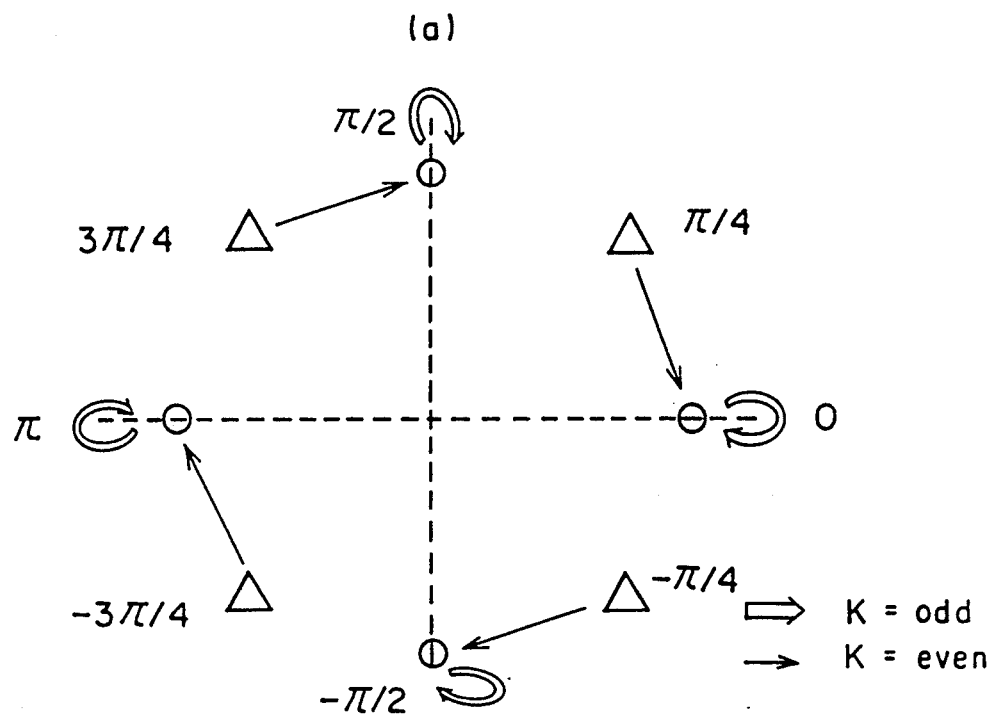
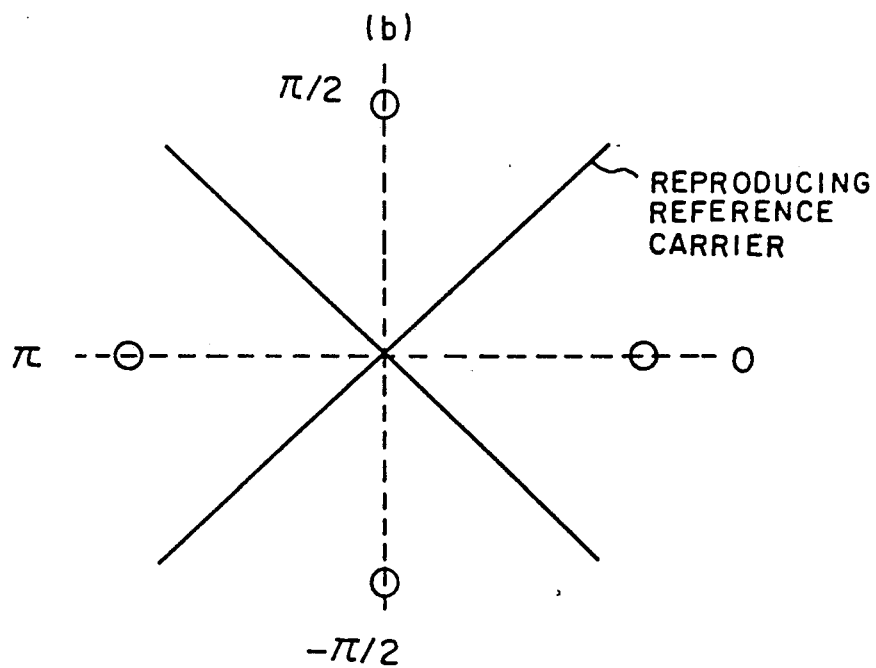

※ T F/F : TOGGLE FLIP FLOP

COHERENT DEMODULATOR FOR π/4 SHIFTED QPSK SIGNAL

BACKGROUND OF THE INVENTION

1. Field of the Invention

The present invention relates to a demodulator for demodulating a π/4 shifted QPSK signal.

2. Description of the Prior Art

FIG. 1 is a block diagram showing the structure of a quaternary-phase shift keying signal (hereinafter called "QPSK signal") decision/feedback type Costas loop, which is used as a conventional QPSK demodulator. Referring to FIG. 1, there are shown an input terminal 1 for receiving a QPSK signal, a first phase detector (hereinafter called "first PSD") 2 for detecting the phase difference between the input signal and a reference signal, a second phase detector (hereinafter called "second PSD") 3 for detecting the phase difference between the input signal and a signal 90° shifted from the reference signal, a π/2 (90°) phase-shifter 4 for phase-shifting the reference signal by 90°, a sign detector 5 for determining the sign of the output signals from the first and second PSDs 2, 3, a first multiplier 6 for multiplying the output signal of the first PSD 2 by a sign indicative of the output signal of the second PSD 3 outputted from the sign detector 5, a second multiplier 7 for multiplying the output signal of the second PSD 3 by a sign indicative of the output signal of the first PSD 2 outputted from the sign detector 5, a subtractor 8 for subtracting output signals from the first and second multipliers 6, 7, and a loop filter (hereinafter called "LF") 9 for band-limiting a frequency of an output signal of the subtractor 8, a voltage-controlled oscillator (hereinafter called "VCO") 10 for controlling the oscillating frequency in accordance with the output signal from subtractor 8 whose frequency is band-limited by the LF 9, and output terminals 11, 12 which supply the signals from phase detectors 2 and 3 to a data symbol detector 13 which determines the binary multisymbol data represented by the output signals of PSD's 2 and 3, and outputs such at terminal 15.

A description will now be made of the operation of the Costas loop demodulator. The transmitted QPSK signal to be received is applied to the input terminal 1. This input signal is conveyed to two branches, i.e., one for the first PSD 2 and the other for the second PSD 3. Then, the input signal applied to the first PSD 2 is phase-detected in accordance with an output reference signal from the VCO 10. Similarly, the input signal applied to the second PSD 3 is also phase-detected in accordance with an output reference signal that has been shifted by 90° from the π/2 phase-shifter 4.

The conventional QPSK signal applied to terminal 1 is represented in accordance with the following equation (1):

$$s(t) = A\sin\{\omega_s t + (2k(t)+1)\pi/4 + \theta_i\} \qquad (1)$$

In the above equation (1), the term A represents the amplitude of the input signal, the term $\omega_s$ represents its center angular frequency, the term $\theta_i$ represents its initial phase, and the term k(t) represents a modulating signal. The term k(t) will be defined as being 0, 1, 2, 3 (i.e., k(t)=0, k(t)=1, k(t)=2, k(t)=3 corresponding to the binary symbol pairs (1,1), (1,0), (0,0), (0,1) of the modulating signal having two channels P and Q, which signal changes for each clock period In other words, binary pairs 11, 10, 00, and 01 are represented by s(t) having phases of π/4, 3π/4, −3π/4, and −π/4 respectively.

On the other hand, the output signal of the VCO 10 is represented by the following equation (2):

$$V(t) = 2\cos(\omega_v t + \theta_0) \qquad (2)$$

In the equation (2), the coefficient 2 represents the amplitude of the output signal from the VCO 10, the term $\omega_v$ designates its center angular frequency, and the term $\theta_0$ shows its initial phase.

Here, the output signal of the first PSD 2 is given by the low-frequency component of the product of the above-described two signals, i.e., s(t) and V(t). This output signal will be represented as $P_1(t)$ in accordance with the following equation (3):

$$P_1(t) = A\sin\{(\omega_s - \omega_v)t + (2k(t)+1)\pi/4 + (\theta_i - \theta_0)\} \qquad (3)$$

In addition, when $\omega_s = \omega_v$ in the above equation (3), this equation is rewritten as the equation (4). The output signal at this time is represented as in FIG. 2(a).

$$P_1(t) = A\sin\{(2k(t)+1)\pi/4 + (\theta_i - \theta_0)\} \qquad (4)$$

On the other hand, the output signal of the π/2 phase-shifter 4 is given by the following equation (5):

$$V_d(t) = 2\sin(\omega_v t + \theta_0) \qquad (5)$$

The signal represented by the equation (5) is applied to the second PSD 3. The output signal obtained when $\omega_s = \omega_v$ is represented as in FIG. 2(b) by the following equation (6):

$$P_2(t) = A\cos\{(2k(t)+1)\pi/4\} \qquad (6)$$

Now, the output signal of the first PSD 2 is conveyed to two branches, i.e., one for the first multiplier 6 and the other for the sign detector 5. Similarly, the output signal of the second PSD 3 is also conveyed to two branches, i.e., one for the second multiplier 7 and the other for the sign detector 5.

A description will now be made of the construction of the sign detector 5 with reference to FIG. 3. The sign detector 5 comprises two input signal terminals 5a, 5b, two comparators 5c, 5d and two output signal terminals 5e, 5f. Each of the comparators to be described herein is used to determine a sign of the input signal. When the input signal is represented by Y(t), their logic functions can be expressed by the following equation (7):

$$Y(t) = 1 \quad X(t) \leq 0$$
$$= -1 \quad X(t) < 0 \qquad (7)$$

In the above-described manner, a sign of the signal represented by the equation (6) is applied to the other of the inputs of the first multiplier 6, while a sign of the signal represented by the equation (4) is applied to the other of the inputs of the second multiplier 7.

Assuming now that the output signal of the first multiplier 6 is represented by $V_{M1}(t)$, the output signal of the first multiplier 6 is expressed as in FIG. 2(c) by the following equation (8):

$$V_{M1}(t) = A\sin\{\pi/4 + (\theta_i - \theta_0)\} \quad k(t) = 0 \quad (8)$$
$$= -A\cos\{\pi/4 + (\theta_i - \theta_0)\} \quad k(t) = 1$$
$$= A\sin\{\pi/4 + (\theta_i - \theta_0)\} \quad k(t) = 2$$
$$= -A\cos\{\pi/4 + (\theta_i - \theta_0)\} \quad k(t) = 3$$

Similarly, assuming that the output signal of the second multiplier 7 is represented by $V_{M2}(t)$, the output signal of the second multiplier 7 is represented as in FIG. 2(d) by the following equation (9):

$$V_{M2}(t) = A\cos\{\pi/4 + (\theta_i - \theta_0)\} \quad k(t) = 0 \quad (9)$$
$$= -A\sin\{\pi/4 + (\theta_i - \theta_0)\} \quad k(t) = 1$$
$$= A\cos\{\pi/4 + (\theta_i - \theta_0)\} \quad k(t) = 2$$
$$= -A\sin\{\pi/4 + (\theta_i - \theta_0)\} \quad k(t) = 3$$

Next, when the equation (9) is subtracted from the equation (8) in the subtractor 8, the resultant output signal $e_0(t)$ is represented as in FIG. 2(e) by the following equation (10) regardless of the values of k(t):

$$e_0(t) = A\sin\{\pi/4 + (\theta_i - \theta_0)\} - \quad (10)$$
$$A\cos\{\pi/4 + (\theta_i - \theta_0)\}$$
$$= \sqrt{2} A\sin(\theta_i - \theta_0)$$

This $e_0(t)$ is referred to as the phase error voltage and is applied to a frequency control terminal of the VCO 10 through the LF 9 (band-limitation processing). This $e_0(t)$ controls the frequency of VCO 10 such that $\theta_i = \theta_0$ in the VCO 10. the output signal of the VCO 10 at that time is represented in accordance with the following equation (11):

$$V(t) = 2\cos(\omega_s t + \theta_i + n\pi/2) \quad (11)$$

where n=0, 1, 2, 3

This V(t) is referred to as the recovered reference carrier (reference signal) and is also in synchronization with the input signal s(t). The term $n\pi/2$ represents the four possible phases of the output signal V(t) synchronized with the input signal s(t) as shown in FIG. 2(e). The reference character n has an equal probability of falling into any one of 0, 1, 2 and 3.

Incidentally, the above-described QPSK signal decision/feedback type Costas loop is disclosed, for example, in Gardner, "Phaselock Techniques", p. 223, John Wiley & Sons.

Since the QPSK signal decision/feedback type Costas loop as a conventional QPSK demodulator is constructed as described above, when a $\pi/4$ shifted QPSK signal is inputted at terminal 1, the output signal of the VCO will alternate between the following equations (11) and (12) with each clock period.

$$V(t) = 2\cos(\omega_x t + \theta_i + n\pi/2) \quad (11)$$

where n=0, 1, 2, 3

$$V(t) = 2\cos(\omega_s t + \theta_i + n\pi/2 + \pi/4) \quad (12)$$

where n=0, 1, 2, 3.

The conventional Costas loop demodulator therefore cannot be used to demodulate a $\pi 4$/shifted QPSK signal as the output signal V(t) cannot be synchronized with the $\pi/4$ shifted QPSK input signal because of the alternating constellation shift of this signal.

The $\pi/4$ shifted QPSK signal modulation system is now described with reference to FIG. 5. In normal QPSK modulation, a modulated carrier signal has one of four phases which denote a binary data pair, i.e. 00, 01, 10, or 11. Two possible choices for the four phase angles are 0, $\pm\pi/2$, $\pi$, or $\pm\pi/4$, $\pm 3\pi/4$. In FIG. 5, o represents the former and $\Delta$ represents the latter choice, or "signal constellation". However, symbol transitions of 180°, i.e. from $\pi/2$ to $-\pi/2$, such as for a data sequence 1100, require the carrier to pass through zero amplitude, meaning that a wide dynamic range amplifier such as a class A amplifier is needed. However, class A amplifiers operate very inefficiently.

In a $\pi/4$ shifted QPSK scheme, the signal phases alternate between 0, $\pm\pi/2$, $\pi$ (o), and $\pm\pi/4$, $\pm 3\pi/4$ ($\Delta$) for each successive symbol pair. Thus, the carrier must pass through only the paths indicated by the arrows between the phases ◯ and $\Delta$ and not through zero amplitude, so that more efficient amplifiers such as class B or class C can be used in the transmitter.

SUMMARY OF THE INVENTION

With the foregoing problem in view, it is an object of this invention to provide a $\pi/4$ shifted QPSK signal demodulator of a type wherein a $\pi/4$ shifted QPSK signal to be outputted stably converges to one of the equations (11) and (12) to be capable of coherent demodulation in the case where the $\pi/4$ shifted QPSK signal is inputted to a QPSK signal decision/feedback type Costas loop.

The $\pi/4$ shifted QPSK signal demodulator according to the present invention is of a type wherein a $\pi/4$ shift circuit is provided in a conventional QPSK signal decision/feedback type Costas loop demodulator so as to alternately shift or rotate the phase of each of output signals inputted to a sign detector from first and second PSDs by 0 and $-\pi/4$ for each symbol period, thus eliminating the $\pi/4$ shift component of the inputted $\pi/4$ shifted QPSK signal.

The $-\pi/4$ phase-shift circuit employed in the present invention alternately shifts or rotates the phases of the output signals from the first and second PSDs by 0 and $-\pi/4$ at intervals of the symbol period so as to eliminate the $\pi/4$ shift component of the inputted $\pi/4$ shifted QPSK signal.

The above and other objects, features and advantages of the present invention will become apparent from the following description and the appended claims, taken in conjunction with the accompanying drawings in which preferred embodiments of the present invention are shown by way of illustrative example only and are not to be construed as limitative of the present invention.

BRIEF DESCRIPTION OF THE DRAWINGS

FIGS. 6(a) and 6(b) are diagrams for describing the operation of phase transition of an output signal of the $-\pi/4$ phase-shift circuit in a case where an enable signal is inputted under the condition that k=odd integer in the first embodiment of this invention;

FIGS. 7(a) and 7(b) are diagrams for describing the operation of phase transition of an output signal of the $-\pi/4$ phase-shift circuit in a case where an enable signal is inputted under the condition that k=even integer in the first embodiment of this invention;

DETAILED DESCRIPTION OF THE PREFERRED EMBODIMENTS

Figure 1:
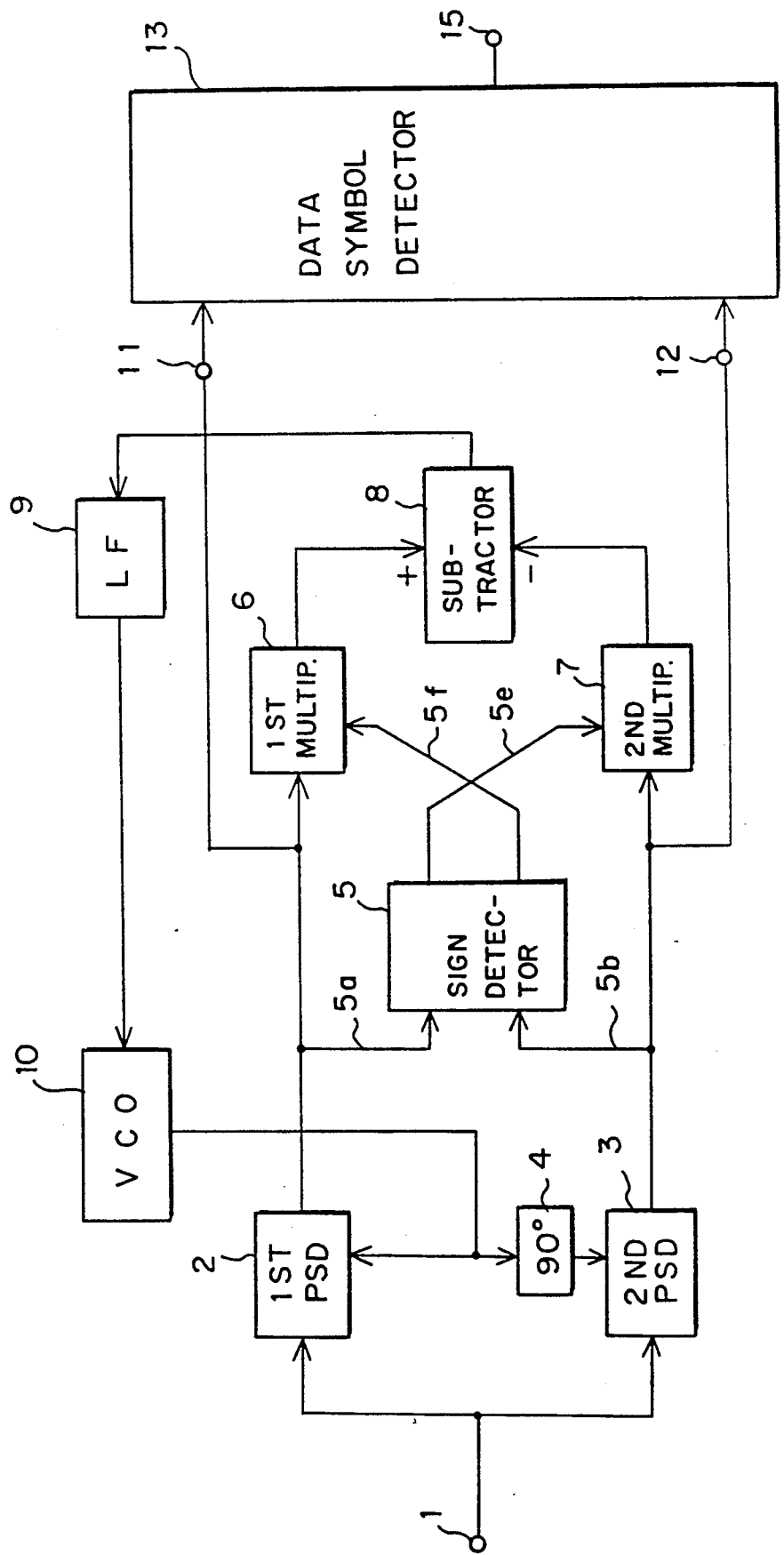
FIG. 1 is a block diagram showing a structure of a QPSK signal decision/feedback type Costas loop conventional demodulator.
Figure 2:
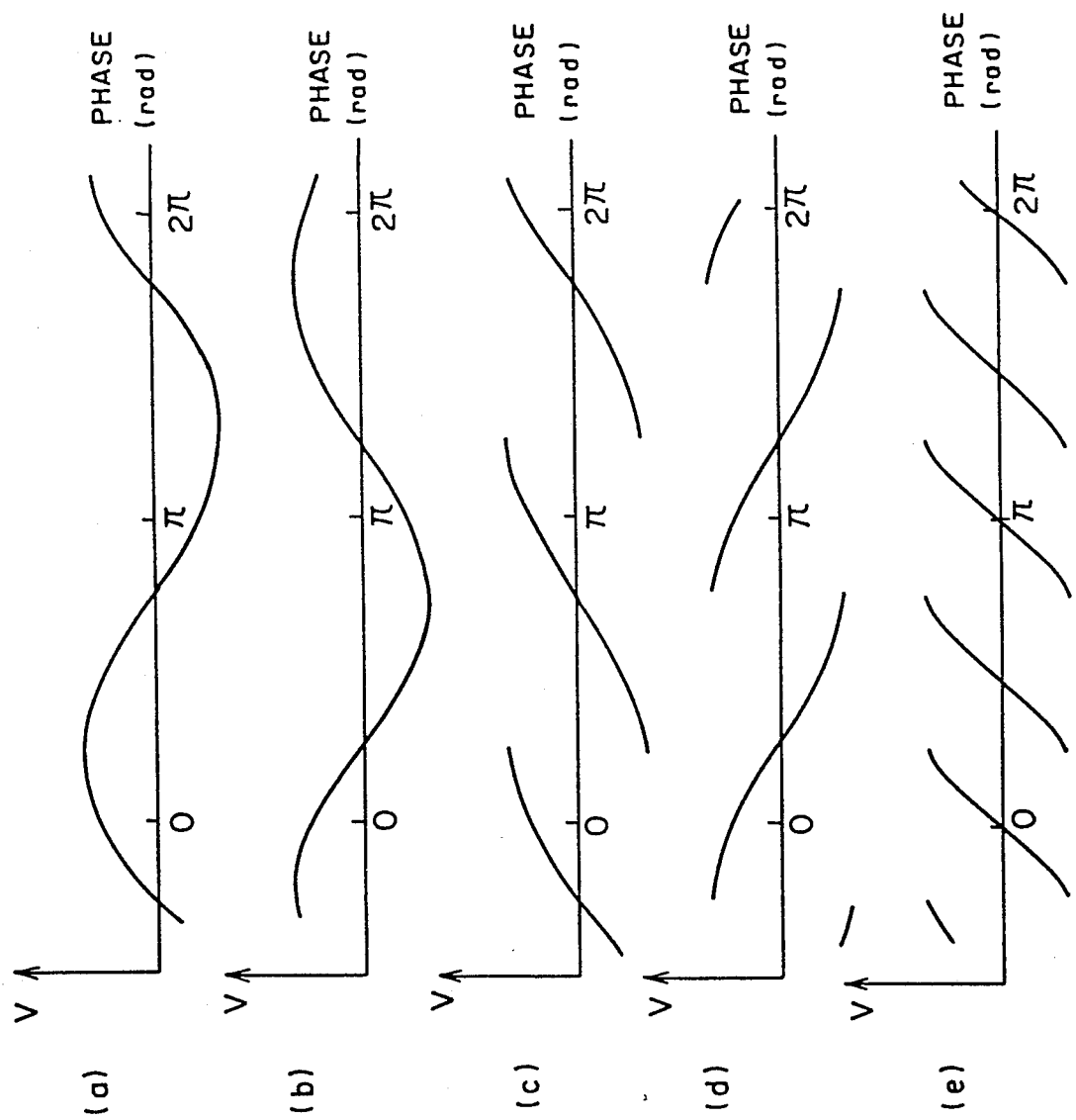
FIG. 2 is a diagram showing output waveforms at respective components employed in the QPSK signal decision/feedback type Costas loop.
Figure 3:
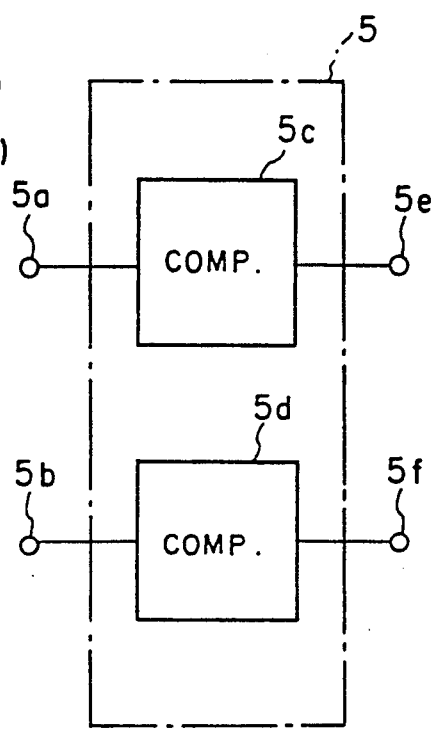
FIG. 3 is a block diagram showing a structure of a sign detector 5 employed in the QPSK signal decision/feedback type Costas loop of FIG. 1.
Figure 4:
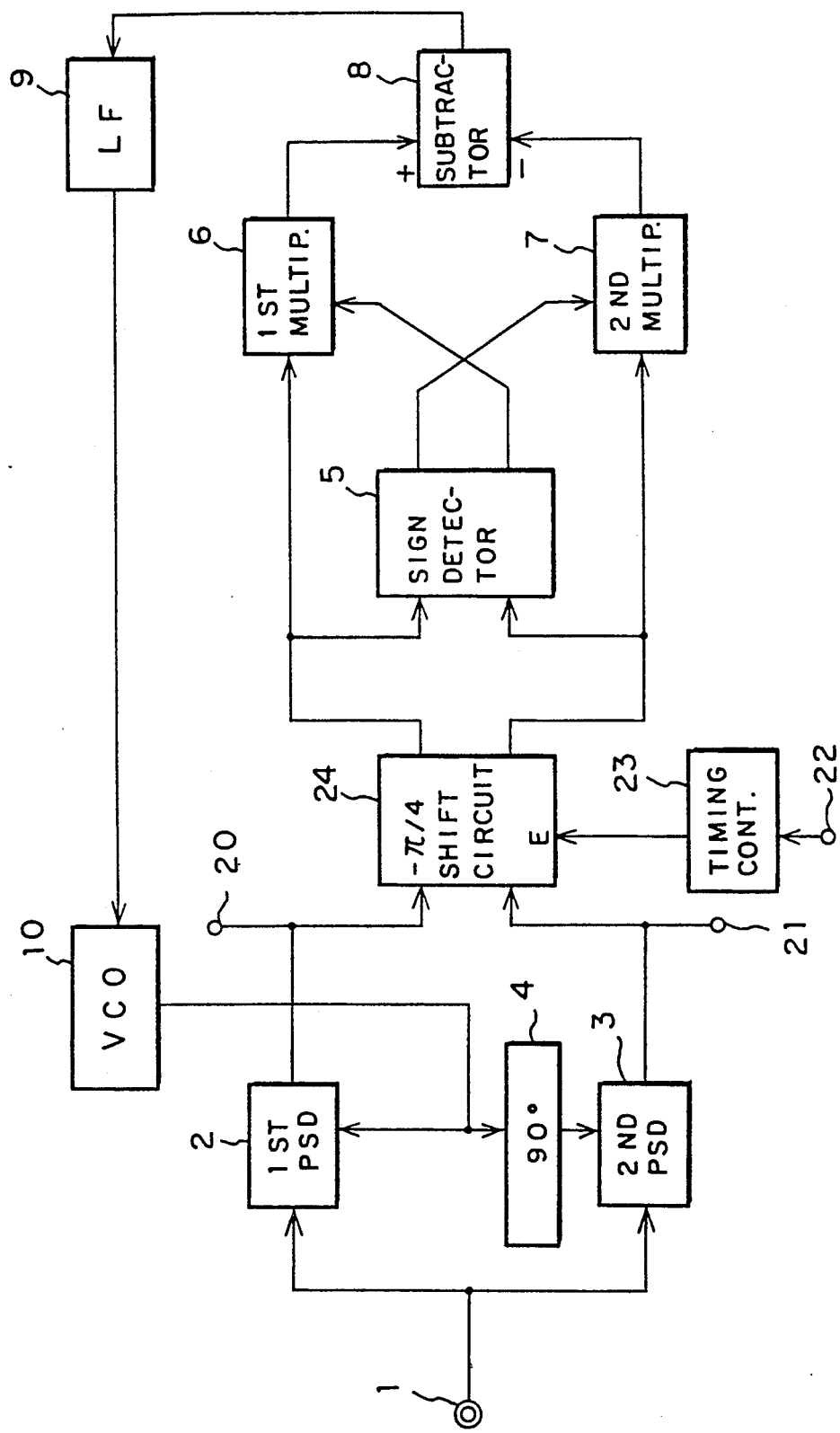
FIG. 4 is a block diagram depicting a structure of a demodulator according to a first embodiment of this invention.

FIG. 4 is a block diagram showing a structure of a demodulator according to a first embodiment of this invention, which is used to demodulate a $\pi/4$ shifted QPSK signal. The same elements of structure as those in conventional QPSK signal decision/feedback type Costas loop (see FIG. 1) are identified by like reference numerals and their description will therefore be omitted.

Referring to FIG. 4, there are shown output terminals 20, 21 for outputting signals from first and second PSDs 2, 3 to a data symbol detector (not shown) for determining binary symbol pairs that have been transmitted, an input terminal 22 supplied with a symbol clock signal, a timing controller 23 receiving the symbol clock signal from terminal 22 for alternately outputting an enable signal and a disable signal for each symbol period, and a $-\pi/4$ phase-shift circuit 24 operating to shift or rotate the phases of the output signals from the first and second PSDs 2, 3 by $-\pi/4$ when supplied with the enable signal from the timing controller 23, and to output the output signals as they are (without any phase shift) when supplied with the disable signal from the timing controller 23.

Figure 13:
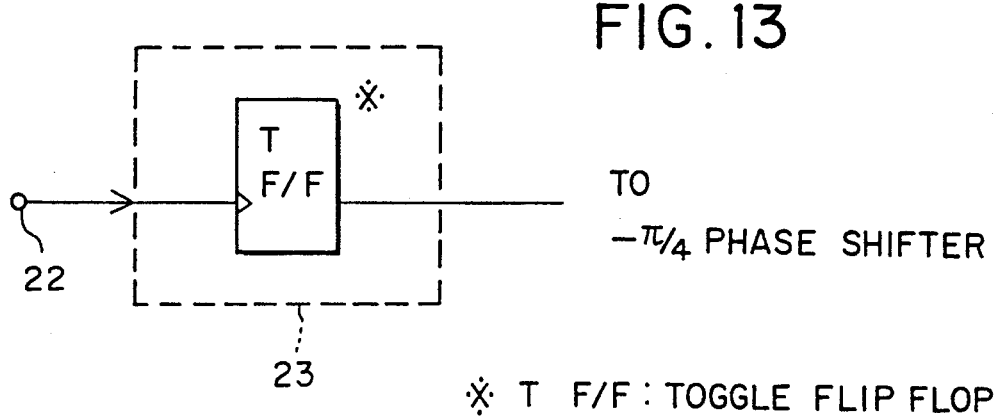
FIG. 13 is a block diagram of timing controller 23 of FIGS. 4, 9 and 11.

As shown in FIG. 13, timing controller 23 can be constituted by a toggle flip-flop IC which alternates its output between 1 and 0 each time a clock pulse is applied at terminal 22.

A description will now be made of the operation of the first embodiment.

A received $\pi/4$ shifted QPSK signal inputted to the input terminal 1 first is split into two branches and is inputted to the first and second PSDs 2, 3. An input signal $S_{\pi/4}(t)$ is represented by the following equation (13):

$$S_{\pi/4}(t) = A\sin(\omega_s t + \alpha_k + \theta_i) \quad (13)$$

Figure 5:
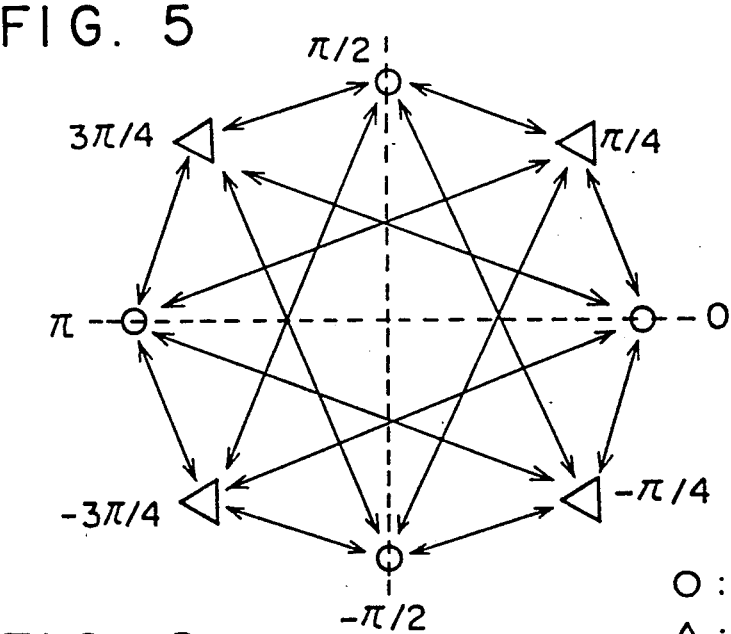
FIG. 5 is a diagram for describing states of phase transitions of a $\pi/4$ shifted QPSK signal.

$\alpha_k$ represents the phases of the signal as explained with reference to FIG. 5.

$\alpha_k \in \{0, \pi/2, \pi, -\pi/2\}$ for k=odd integer $\alpha \in \{\pi/4, 3\pi/4, -3\pi/4, \pi/4\}$ for k=even integer.

An output reference carrier of VCO 10 is represented by the equation (2) in the same manner as in the conventional example. Here, the output signal $P_{\pi/4,1}(t)$ of the first PSD 2 is given by the low-frequency component of the product of the equation (2) and the equation (13). When $\omega_s = \omega_v$, the output signal $P_{\pi/4,1}(t)$ is expressed as follows:

$$P_{\pi/4,1}(t) = A\sin\{\alpha_k + (\theta_i - \theta_0)\} \quad (14)$$

On the other hand, the output signal $P_{\pi/4,2}(t)$ of the second PSD 2 is represented in accordance with the following equation (15):

$$P_{\pi/4,2}(t) = A\cos[\alpha_k + (\theta_i - \theta_0)] \quad (15)$$

Figure 14:
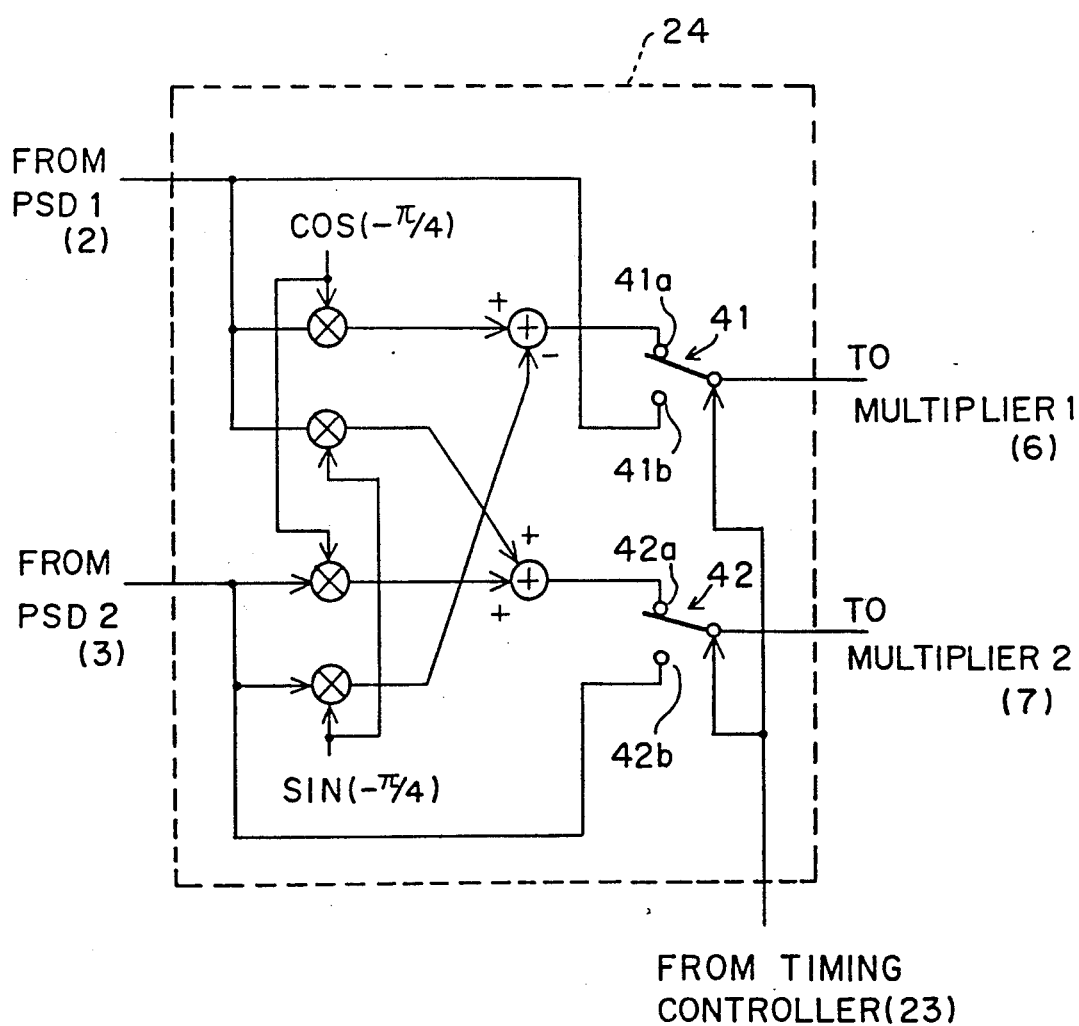
FIG. 14 is a block diagram of $\pi/4$ phase shifter 24 of FIG. 4.

The output signals of the first and second PSDs 2, 3 are applied to the $-\pi/4$ phase-shift circuit 24 controlled by the timing controller 23. FIG. 14 shows one possible construction of such a phase-shift circuit. The $-\pi/4$ phase-shift circuit 24 is alternately supplied with the enable signal and the disable signal from the timing controller 23 for each symbol period. When supplied with the enable signal, the $-\pi/4$ phase-shift circuit 24 serves to rotate the phases of the output signals of the first and second PSDs 2, 3 by $-\pi/4$, as switches 41 and 42 are controlled to move to contact terminals 41a and 42a respectively, while when supplied with the disable signal, the $-\pi/4$ phase-shift circuit 24 outputs the output signals as they are by virtue of switches 41 and 42 closing to contact terminals 41b and 42b respectively.

Assuming that the timing controller 23 outputs the enable signal when k=odd, and the disable signal when k=even, output signals $V_{-\pi/4,1}(t)$ (corresponding to the input signal $P_{\pi/4,1}(t)$) and $V_{-\pi/4,2}(t)$ (corresponding to the input signal $P_{\pi/4,2}(t)$) are represented by the following equations (16) and (17). A state of phase shifting of the outputs of PSDs 2 and 3 produced by the operation of the $-\pi/4$ phase-shift circuit 24 when $\theta_i = \theta_0$ is shown in FIG. 6(a), and the resultant phases of the output signals of the $-\pi/4$ phase-shift circuit 24 are shown in FIG. 6(b).

$$V_{-\pi/4,1}(t) = A\sin\{\beta_k + (\theta_i - \theta_0)\} \quad (16)$$

$$V_{-\pi/4,2}(t) = A\cos\{\beta_k + (\theta_i - \theta_0)\} \quad (17)$$

where $\beta_k \in \{\pi/4, 3\pi/4, -3\pi/4, -\pi/4\}$

The equations (16) and (17) representing the outputs of the $-\pi/4$ phase-shift circuit 24 coincide with the equations (4) and (6). Therefore, the output of the subtractor 8 is represented by the equation (10) in the same manner as in the conventional example.

Then, an output signal $e_0(t)$ (see equation (10)) is applied to the VCO 10 through an LF 9 (through bandlimited processing), and the oscillating frequency of the VCO 10 is controlled such that $\theta_i = \theta_0$. The output reference signal of the VCO 10 at this time is represented by the equation (11) in the same manner as in the conventional example.

Next assuming that the timing controller 23 outputs the enable signal when k=even while it outputs the disable signal when k=odd, output signals $W_{-\pi/4,1}(t)$ (corresponding to an input signal $P_1(t)$) and $W_{-\pi/4,2}(t)$ (corresponding to an input signal $P_2(t)$) are represented by tee following equations (18) and (19). A state of phase shifting of the outputs of PSDs 2 and 3 produced by the operation of the $-\pi/4$ phase-shift circuit 24 when $\theta_i=\theta_0$ is shown in FIG. 7(a), and the resultant phases of the output signals of the $-\pi/4$ phase-shift circuit 24 are shown in FIG. 7(b).

$$W_{-\pi/4,1}(t)=A\sin\{\gamma_k+(\theta_i-\theta_0)\} \quad (18)$$

$$W_{-\pi/4,2}(t)=A\cos\{\Gamma_k+(\theta_i-\theta_0)\} \quad (19)$$

where $\gamma_k \in \{0, \pi/2, \pi, 3\pi/2\}$

Figure 8:
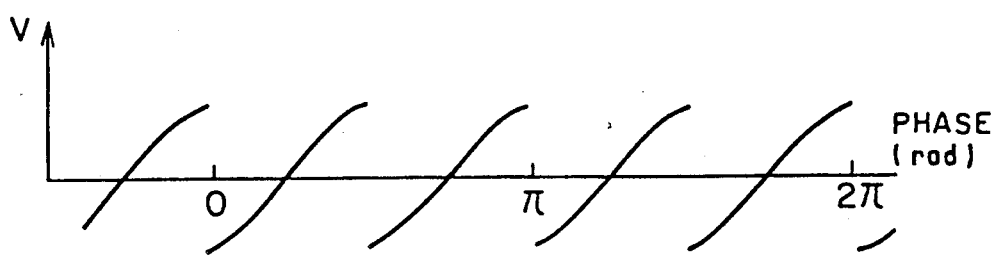
FIG. 8 is a diagram for describing an output signal of a subtractor employed in the first embodiment of this invention.

The equations (18) and (19) representing the output signals of this $\pi/4$ phase-shift circuit 24 also coincide with the equations (4) and (6). Thus, an output signal $e_{01}(t)$ of the subtractor 8 is represented by the following equation (20). The control voltage of the output signal $e_{01}(t)$ is shown in FIG. 8.

$$e_{01}(t)=\sqrt{2}\, A\sin(\theta_i-\theta_0-\pi/4) \quad (20)$$

Then, the output signal $e_{01}(t)$ of the subtractor 8 is applied to the VCO 10 through the LF 9 (through the band-limited processing). The oscillating frequency of VCO 10 is so controlled that $\theta_1=\theta_0$. An output signal $V_1(t)$ of the VCO 10 at that time is represented in accordance with the following equation (21):

$$V_1(t)=2\cos\{\omega_s t+\theta_i+(2m+1)\pi/4\} \quad (21)$$

where $m=0, 1, 2, 3$

The output signal $V(t)$ of the VCO 10 is referred to as the "recovered reference carrier" reference signal in the same manner as in the equation (11), and is in synchronization with the input signal.

As described above, the output signal of the VCO 10 converges either on the equation (11) if the phase of the output signal is shifted or rotated by $-\pi/4$ when $k=\text{odd}$, or on the equation (21) if the phase of the output signal is shifted or rotated by $-\pi/4$ when $k=\text{even}$. It is therefore possible to produce demodulated waveform signals representative of stable $\pi/4$ shifted QPSK signals at the output terminals 20, 21, since a stable reference carrier can be produced by VCO 10 from Costas loop control.

The output signals from the first and second PSDs 2, 3 have been applied to the $-\pi/4$ phase-shift circuit 24 in the above-described embodiment. However, the output signal of the subtractor 8 may be inputted to the $-\pi/4$ phase-shift circuit to achieve the same result. Such an embodiment is described with reference to FIG. 9.

Figure 9:
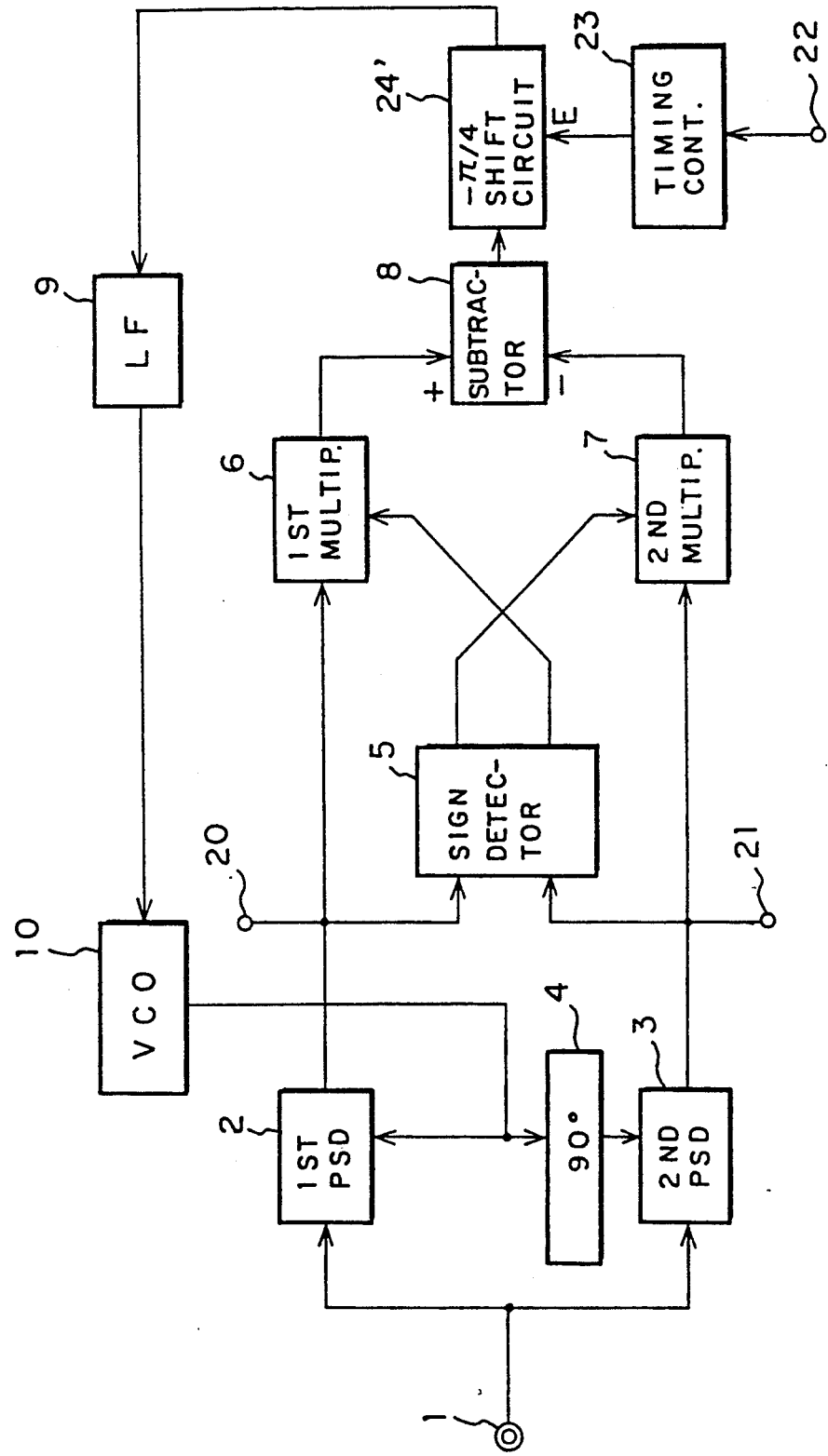
FIG. 9 is a block diagram showing a structure of a demodulator according to a second embodiment of this invention.

FIG. 9 is a block diagram showing a structure of a $\pi/4$ shifted QPSK demodulator according to a second embodiment of this invention, in which the $-\pi/4$ phase-shift circuit 24 is supplied with the output signal of the subtractor 8.

A description will now be made of the operation of the second embodiment.

Figure 10:
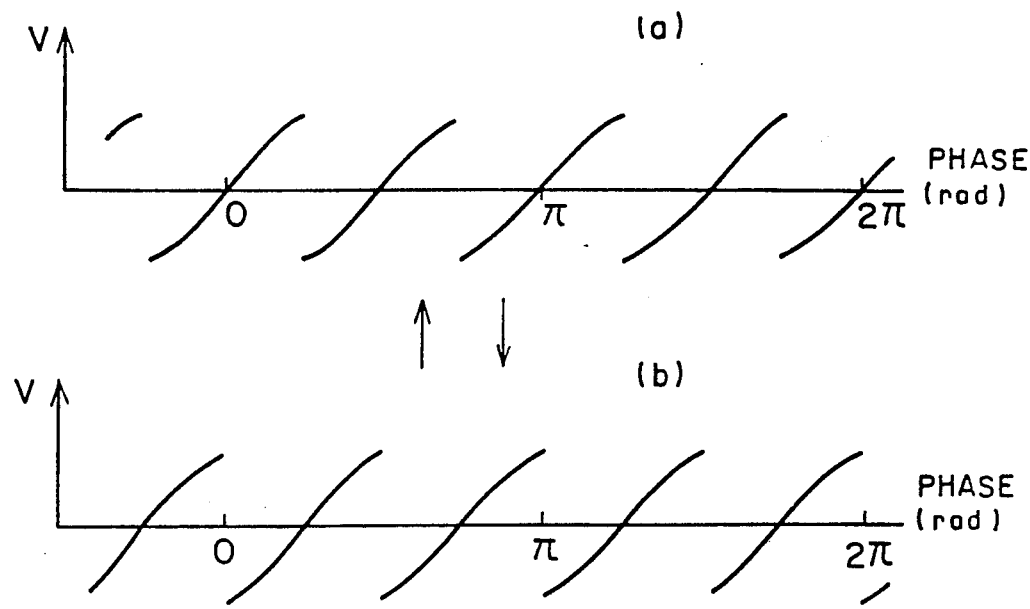
FIGS. 10(a) and (b) are diagrams for describing an output signal of a subtractor employed in the second embodiment of this invention.

When the $\pi/4$ shifted QPSK signal is applied to the input terminal 1, the output signal of the subtractor 8 differs according to whether $k=\text{odd}$ or $k=\text{even}$ in the equation (13). When $k=\text{even}$, the output signal of the subtractor is shown in FIG. 10(a), while when $k=\text{odd}$, the output signal thereof is shown in FIG. 10(b). By inputting the output signal of the subtractor 8 to the $-\pi/4$ phase-shift circuit 24, controlled by the timing controller 23, the output signal from the $-\pi/4$ phase-shift circuit 24, converges on one of the waveforms represented by FIG. 10(a) and FIG. 10(b), and the output signal of the VCO 10 falls into the representation of either the equation (11) or the equation (21) accordingly. Therefore, the synchronization/detection demodulating processing in which the output signal of the VCO 10 is a stable reference signal is enabled.

Figure 15:
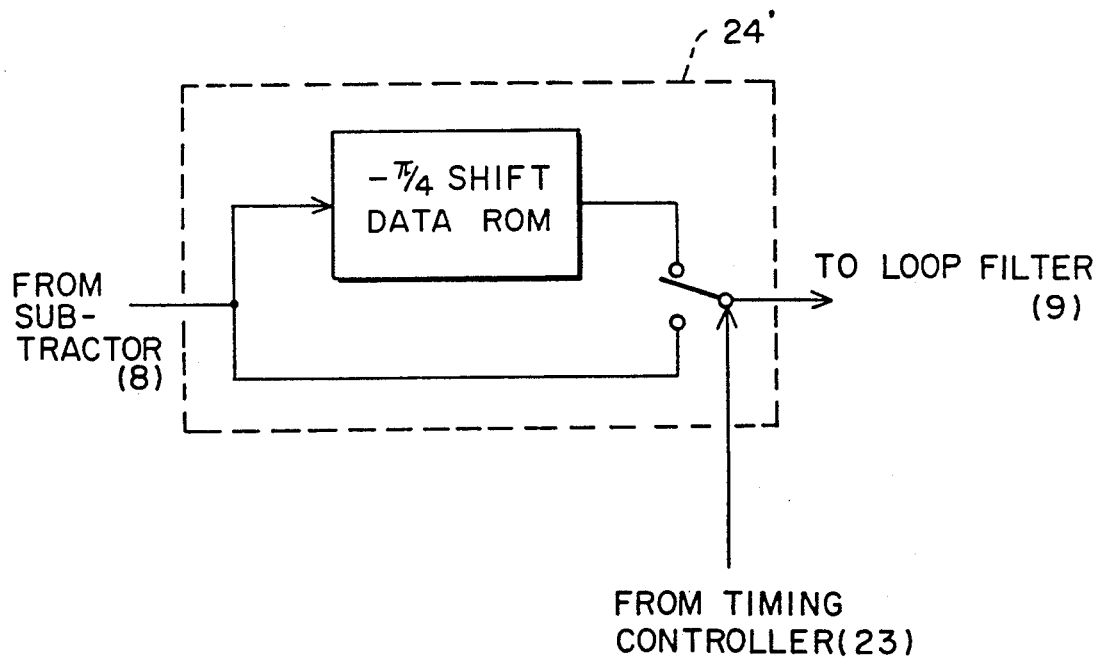
FIG. 15 is a block diagram of $\pi/4$ phase shifter 24' of FIG. 9.

FIG. 15 is a block diagram showing one possible construction of a phase-shift circuit 24' according to the second embodiment of the invention.

As shown, a memory ROM may be utilized as a look-up table which stores $-\pi/4$ phase shift data corresponding to each particular input signal from subtractor 8. The signal from subtractor 8 is thus phase-shifted by $-\pi/4$ in accordance with the enable signal from timing controller 23, as explained above with reference to FIG. 14.

Figure 11:
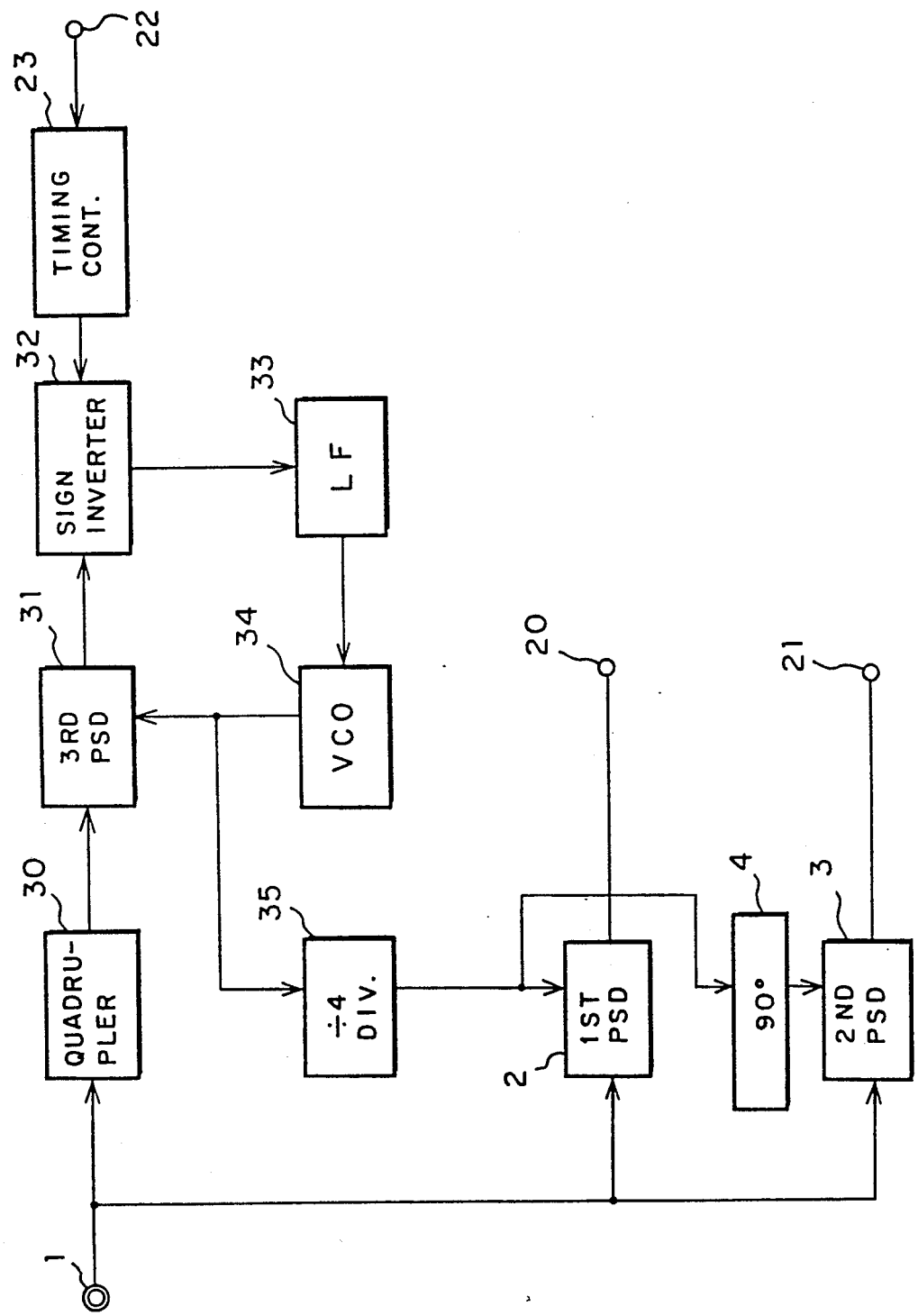
FIG. 11 is a block diagram depicting structure of a demodulator according to a third embodiment of this invention.

FIG. 11 is a block diagram showing a structure of a demodulator according to a third embodiment of this invention, which is used to demodulate a $\pi/4$ shift QPSK signal, where instead of using a phase-shift circuit, quadrupler PLL (phase locked loop) circuit with a sign inverter is used to achieve the same result. The same elements of structure as those in the first and second embodiments (FIG. 4 and 9) are identified by like reference numerals and their description will therefore be omitted.

Referring to FIG. 11, there are shown a frequency signal quadrupler 30 for providing an output signal of four times the frequency of the $\pi/4$ shifted QPSK signal inputted to the input terminal 1, a third PSD 31 for detecting the phase difference between the input signal multiplied by the quadrupler 30 and the reference signal outputted from the VCO 10, a sign inverter 32 for causing a sign indicative of an output signal from the third PSD 31 to be inverted for each symbol period under the control of a timing controller 23, an LF 33, a VCO 34 and a divide-by-four frequency divider 35 for frequency-dividing the reference signal outputted from the VCO 34 by four.

A description will now be made of the operation of the third embodiment.

The $\pi/4$ shifted QPSK signal inputted to the input terminal 1 flows into three branches so as to be applied to each of the quadrupler 30, the first PSD 2 and the third PSD 3. Assuming now that the input signal $S_{\pi/4}(t)$ is the same as that employed in the first embodiment (see equation (13)), this input signal is multiplied by four in the quadrupler 30 and is then outputted as the output signal $S_{\pi4}(t)$ represented by the following equation (30):

$$\begin{aligned} S_{x4}(t) &= A^4\sin^4(\omega_s t + \alpha_k + \theta_i) \\ &= K\cos\{4(\omega_s t + \alpha_k + \theta_i)\} \\ &= K\cos(4\omega_s t + 4\theta_i + \epsilon_k) \end{aligned} \quad (30)$$

where $$\epsilon_k = 0 \ (k = \text{odd})$$
$$= \pi \ (k = \text{even})$$
$$K = A^4/8$$

In the above equation, the frequency components other than that of the quadrupled frequency as described above will be omitted for simplicity.

The output signal $V_{x4}(t)$ of the VCO 34 is represented by the following equation (31):

$$V_{x4}(t) = -2\sin(4\omega_s t + 4\zeta_0) \quad (31)$$

Figure 12:
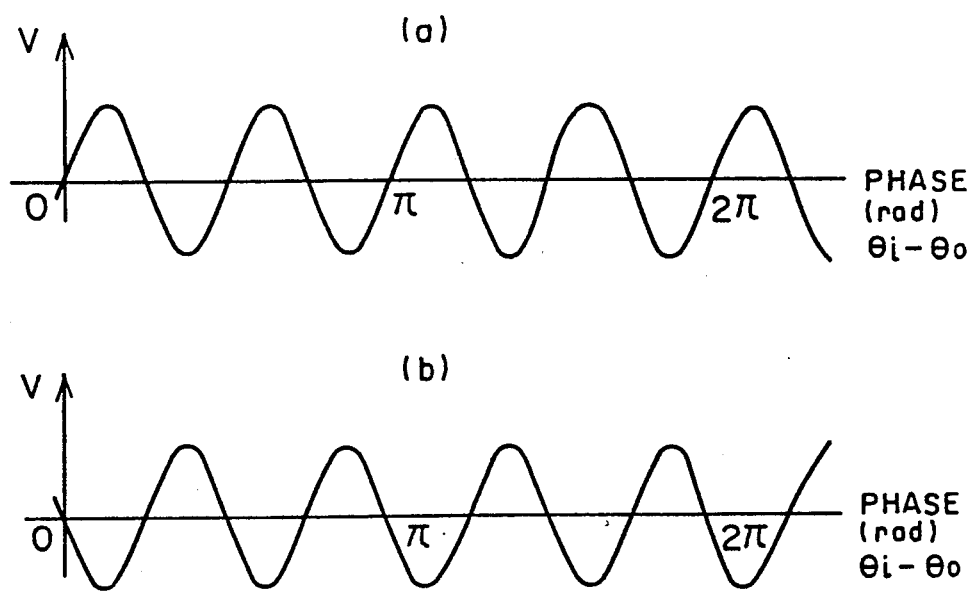
FIGS. 12(a) and (b) are diagrams for describing an output signal of a third PSD employed in the third embodiment of this invention.

The output signal $P_3(t)$ from the third PSD 31, which is supplied with the output signal of the quadrupler 30 and the output signal of the VCO 34, is represented by the product of these two output signals as in the following equation (32). When k=odd, its output signal shown in FIG. 12(a), while when k=even, its output signal is shown in FIG. 12(b).

$$P_3(t) = S_{x4}(t) \times V_{x4}(t) \qquad (32)$$
$$= K\sin\{4(\theta_i - \theta_0) + \epsilon_k)\}$$

where the high frequency component would be removed when $\omega_s = \omega_v$.

In addition, the output signal of the third PSD 31 is applied to the sign inverter 32. However, the sign inverter 32 is alternately supplied with an enable signal and a disable signal for each symbol period from the timing controller 23. When the enable signal is inputted to the sign inverter 32, the sign inverter 32 serves to invert the sign of the input signal from the third PSD 31, while when the disable signal is applied thereto, the sign inverter 32 serves to output the same as it is.

Assume that when k=odd, the timing controller 23 outputs the enable signal, while when k=even, it outputs the disable signal. In this case, an output signal $V_{inv}(t)$ of the sign inverter 32 is represented in the form of the following equation (33):

$$V_{inv}(t) = K\sin\{4(\theta_i - \theta_0) + \pi\} \qquad (33)$$

The output signal of the sign inverter 32 is applied to the VCO 34 through the LF 33 (band-limited processing). By controlling the oscillating frequency such that $\theta_i = \theta_0$ in the VCO 34, the output signal $V_{x4}(t)$ of the VCO 34 converges to the following equation (34):

$$V_{x4}(t) = -2\sin(4\omega_s t + 4\theta_i + \pi) \qquad (34)$$

Then, the output signal of the VCO 34 is applied to the divide-by-four frequency divider 35 from which a frequency-divided-by-four output signal $V_{\div 4}(t)$ is outputted in accordance with the following equation (35):

$$V_{\div 4}(t) = -2\sin\{\omega_s t + \theta_i + (2m + 1)\pi/4\} \qquad (35)$$
$$= 2\cos\{\omega_s t + \theta_i + (2l + 1)\pi/4\}$$

where m=0, 1, 2, 3 and l=0, 1, 2, 3

Similarly, if the timing controller 23 outputs the disable signal when k=odd, and the enable signal when k=even, the output signal $V_{\div 4}(t)$ of the divide-by-four frequency divider 35 at this time is represented in accordance with the following equation (36):

$$V_{\div 4}(t) = 2\cos(\omega_s t + \theta_i + j\pi/2) \qquad (36)$$
where j=0, 1, 2, 3.

As is apparent from the above description, the equations (35) and (36) representative of the output signals of the divide-by-four frequency divider 35 coincide with the equations (11) and (21), thus illustrating that the reference signal generated by VCO 10 can be stably controlled. Then, the reference signal is split to two branches, i.e., one for the first PSD 2 and the other for the second PSD 3 through a $\pi/2$ phase shifter 4. Then, the first PSD 2 detects the phase difference between the reference signal and the input $\pi/4$ shifted QPSK signal and the second PSD 3 detects the phase difference the reference signal and the input signal. Thereafter, demodulated signals of the inputted $\pi/4$ shifted QPSK signal are produced at the output terminals 20, 21 respectively where they are sent to a data symbol detector for determining the transmitted binary data symbol pairs.

According to this invention, as has been described above, since the $-\pi/4$ shift QPSK circuit serving to alternately rotate the phase of the output signal by 0 and $-\pi/4$ for each symbol period is provided in the conventional QPSK signal decision/feedback type Costas loop so as to eliminate the $\pi/4$ shift component of the inputted $\pi/4$ shifted QPSK signal to enable a stable reference carrier to be generated, the present invention can bring about advantages in that a stable point is defined at every $\pi/2$ phase angle and a $\pi/4$ shifted QPSK signal demodulator permitting a coherent detection processing of the $\pi/4$ shifted QPSK signal can be obtained.

Having now fully described the invention, it will be apparent to those skilled in the art that many changes and modifications can be made without departing from the spirit or scope of the invention as set forth herein.

What is claimed is:

1. A demodulator for coherent demodulation of a $\pi/4$ shifted QPSK signal in which signal constellation phases alternate between two sets of possible phase values for each successive symbol pair, comprising:
   reference means for generating a recovered carrier reference signal;
   means for demodulating an input $\pi/4$ shifted QPSK signal by using said recovered carrier reference signal; and
   means for controlling said reference means by using said demodulated $\pi/4$ shifted QPSK signal, including
      means for compensating a $\pi/4$ shift characteristic of said demodulated $\pi/4$ shifted QPSK signal to develop a compensated signal, and
      means for applying said compensated signal as a control signal to said reference means to cause said recovered carrier reference signal to synchronize with said $\pi/4$ shifted QPSK signal.

2. A demodulator for coherent demodulation of a $\pi/4$ shifted QPSK signal according to claim 1, wherein said reference means comprises a voltage-controlled oscillator (VCO) for changing the frequency of said recovered carrier reference signal in response to said control signal.

3. A demodulator for coherent demodulation of a $\pi/4$ shifted QPSK signal according to claim 2, wherein said means for demodulating comprises:
   a first phase detector for detecting a phase difference between said input $\pi/4$ shifted QPSK signal and said recovered carrier reference signal and generating an output signal corresponding thereto; and
   a second phase detector for detecting a phase difference between said input $\pi/4$ shifted QPSK signal and a signal produced by shifting the phase of said recovered carrier reference signal by $\pi°$, and generating an output signal corresponding thereto.

4. A demodulator for coherent demodulation of a $\pi/4$ shifted QPSK signal, comprising:
   reference means for generating a recovered carrier reference signal;

means for demodulating an input π/4 shifted QPSK signal by using said recovered carrier reference signal; and means for controlling said reference means by using said demodulated π/4 shifted QPSK signal, including means for compensating a π/4 shift characteristic of said demodulated π/4 shifted QPSK signal to develop a compensated signal, and means for applying said compensated signal as a control signal to said reference means to cause said recovered carrier reference signal to synchronize with said π/4 shifted QPSK signal;

wherein said reference means comprises a voltage-controlled oscillator (VCO) for changing the frequency of said recovered carrier reference signal in response to said control signal;

wherein said means for demodulating comprises:

a first phase detector for detecting a phase difference between said input π/4 shifted QPSK signal and said recovered carrier reference signal and generating an output signal corresponding thereto; and a second phase detector for detecting a phase difference between said input π/4 shifted QPSK signal and a signal produced by shifting the phase of said recovered carrier reference signal by π°, and generating an output signal corresponding thereto; and wherein said means for compensating comprises:

a −π/4 phase-shift circuit for shifting the phases of said first and second phase detector output signals by −π/4 in response to an enable signal and passing said first and second phase detector output signals in the absence of said enable signal;

timing control means for developing said enable signal in response to every other clock pulse of a symbol interval clock signal indicating symbol intervals of said π/4 shifted QPSK signal;

sign detector means for outputting a sign signal indicating the sign of output signals of said −π/4 phase-shift circuit;

first and second multipliers each for multiplying one output signal of said −π/4 phase-shift circuit by the sign of the other output signal of said −π/4 phase-shift circuit; and subtractor means for subtracting an output signal of said second multiplier from an output signal of said first multiplier to develop said compensated signal.

5. A demodulator for coherent demodulation of a π/4 shifted QPSK signal according to claim 4, wherein said means for applying comprises a loop filter for band-limiting a frequency of said compensated signal and applying the band-limited signal to said VCO.

6. A demodulator for coherent demodulation of a π/4 shifted QPSK signal, comprising:

reference means for generating a recovered carrier reference signal;

means for demodulating an input π/4 shifted QPSK signal by using said recovered carrier reference signal; and means for controlling said reference means by using said demodulated π/4 shifted QPSK signal, including means for compensating a π/4 shift characteristic of said demodulated π/4 shifted QPSK signal to develop a compensated signal, and means for applying said compensated signal as a control signal to said reference means to cause said recovered carrier reference signal to synchronize with said π/4 shifted QPSK signal;

wherein said reference means comprises a voltage-controlled oscillator (VCO) for changing the frequency of said recovered carrier reference signal in response to said control signal;

wherein said means for demodulating comprises:

a first phase detector for detecting a phase difference between said input π/4 shifted QPSK signal and said recovered carrier reference signal and generating an output signal corresponding thereto; and a second phase detector for detecting a phase difference between said input π/4 shifted QPSK signal and a signal produced by shifting the phase of said recovered carrier reference signal by 90°, and generating an output signal corresponding thereto; and wherein said means for compensating comprises:

sign detector means for outputting a sign signal indicating the sign of said first and second phase detector output signals;

first and second multipliers each for multiplying one output signal of said first and second phase detector output signals by the sign of the other output signal of said first and second phase detector output signals;

subtractor means for subtracting an output signal of said second multiplier from an output signal of said first multiplier and developing a subtractor signal corresponding thereto;

a −π/4 phase-shift circuit for shifting the phase of said subtractor signal by −π/4 in response to an enable signal and passing said subtractor signal in the absence of said enable signal, an output of said −π/4 phase-shift circuit constituting said compensated signal; and timing control means for developing said enable signal in response to every other clock pulse of a symbol interval clock signal indicating symbol intervals of said π/4 shifted QPSK signal.

7. A demodulator for coherent demodulation of a π/4 shifted QPSK signal according to claim 6, wherein said means for applying comprises a loop filter for band-limiting a frequency of said compensated signal and applying the band-limited signal to said VCO.

8. A demodulator for coherent demodulation of a π/4 shifted QPSK signal, comprising:

reference means for generating a recovered carrier reference signal;

means for demodulating an input π/4 shifted QPSK signal by using said recovered carrier reference signal; and means for controlling said reference means by using said demodulated π/4 shifted QPSK signal, including means for compensating a π/4 shift characteristic of said demodulated π/4 shifted QPSK signal to develop a compensated signal, and means for applying said compensated signal as a control signal to said reference means to cause said recovered carrier reference signal to synchronize with said π/4 shifted QPSK signal;

wherein said reference means comprises a voltage-controlled oscillator (VCO) for changing the frequency of said recovered carrier reference signal in response to said control signal;

wherein said means for demodulating comprises:

a first phase detector for detecting a phase difference between said input π/4 shifted QPSK signal and said recovered carrier reference signal and generating an output signal corresponding thereto; and a second phase detector for detecting a phase difference between said input π/4 shifted QPSK signal and a signal produced by shifting the phase of said recovered carrier reference signal by 90°, and generating an output signal corresponding thereto; and wherein said means for compensating comprises:

means for multiplying said input π/4 shifted QPSK signal by a predetermined integer;

a third phase detector for detecting a phase difference between said multiplied π/4 shifted QPSK signal and said recovered carrier reference signal and generating an output signal corresponding thereto;

sign inverter means for inverting the sign of said third phase detector output signal in response to an enable signal and passing said third phase detector output signal in the absence of said enable signal, an output of said sign inverter means constituting said compensated signal; and timing control means for developing said enable signal in response to every other clock pulse of a symbol interval clock signal indicating symbol intervals of said π/4 shifted QPSK signal.

9. A demodulator for coherent demodulation of a π/4 shifted QPSK signal according to claim 8, wherein said means for applying comprises a loop filter for band-limiting a frequency of said compensated signal and applying the band-limited signal to said VCO.

10. A demodulator for coherent demodulation of a π/4 shifted QPSK signal according to claim 9, further comprising:

frequency divider means for dividing said recovered carrier reference signal by said predetermined integer and applying said divided reference signal to said first and second phase detectors.

* * * * *

UNITED STATES PATENT AND TRADEMARK OFFICE
CERTIFICATE OF CORRECTION

PATENT NO. : 5,179,578

DATED : January 12, 1993

INVENTOR(S) : Fumio Ishizu

It is certified that error appears in the above-identified patent and that said Letters Patent is hereby corrected as shown below:

Col. 1, line 68, "period" should be --period.--.

Col. 2, line 20, (Formula (3)) "#" should be --$\pi$--.

Col. 2, line 38, (Formula (6)) add -- + $(\theta_i - \theta_0)\}$ --.

Col. 3, line 58, (Formula (11)) "$\omega_x t$" should be --$\omega_s t$--.

Col. 3, line 64, do not start new paragraph.

Col. 7, line 3, "tee" should be --the--.

Col. 7, line 13, "$\Gamma$" should be --$\gamma$--.

UNITED STATES PATENT AND TRADEMARK OFFICE
CERTIFICATE OF CORRECTION

PATENT NO. : 5,179,578
DATED : January 12, 1993
INVENTOR(S) : Fumio Ishizu

It is certified that error appears in the above-identified patent and that said Letters Patent is hereby corrected as shown below:

Col. 7, line 64, "24" should be --24'--.

Col. 7, line 66, "24" should be --24'--.

Col. 8, line 48, "$S_{\pi 4}(t)$" should be --$S_{x4}(t)$--.

Col. 8, line 68, (Formula (31)) "$\varsigma$" should be --$\theta$--.

Col. 10, line 63, "$\pi°$" should be --90°--.

Col. 11, line 27, "$\pi°$" should be --90°--.

Signed and Sealed this

Twenty-fifth Day of January, 1994

Attest:

BRUCE LEHMAN

Attesting Officer     Commissioner of Patents and Trademarks